(12) United States Patent
Liu (10) Patent No.: US 10,664,674 B2
(45) Date of Patent: May 26, 2020

(54) DIGITAL OBJECT UNIQUE IDENTIFIER (DOI) RECOGNITION METHOD AND DEVICE

(71) Applicant: ALIBABA GROUP HOLDING LIMITED, Grand Cayman (KY)

(72) Inventor: Zhengbao Liu, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 0 days.

(21) Appl. No.: 16/284,272

(22) Filed: Feb. 25, 2019

(65) Prior Publication Data

US 2019/0188438 A1    Jun. 20, 2019

Related U.S. Application Data

(63) Continuation of application No. PCT/CN2017/097957, filed on Aug. 18, 2017.

(30) Foreign Application Priority Data

Aug. 30, 2016 (CN) .......................... 2016 1 0787281

(51) Int. Cl.
*G06K 7/14* (2006.01)
*G06K 9/00* (2006.01)

(52) U.S. Cl.
CPC ............. *G06K 7/1443* (2013.01); *G06K 7/14* (2013.01); *G06K 7/1478* (2013.01); *G06K 9/00577* (2013.01); *G06K 7/1413* (2013.01); *G06K 7/1417* (2013.01); *G06K 2009/0059* (2013.01)

(58) Field of Classification Search
CPC .... G06K 7/10722; G06K 7/14; G06K 7/1443; G06K 7/10861

USPC ....... 235/462.08, 462.09, 462.1, 462.01, 375
See application file for complete search history.

(56) References Cited

U.S. PATENT DOCUMENTS

| | | | |
|---|---|---|---|
| 8,180,174 B2 | 5/2012 | Di Venuto et al. | |
| 8,657,189 B2 | 2/2014 | Berkun | |
| 8,763,908 B1 | 7/2014 | Feldman et al. | |
| 9,129,277 B2 | 9/2015 | Macintosh | |
| 9,779,452 B1 | 10/2017 | Medina et al. | |

(Continued)

FOREIGN PATENT DOCUMENTS

| | | |
|---|---|---|
| CN | 1184582 C | 1/2005 |
| CN | 1934483 A | 3/2007 |

(Continued)

OTHER PUBLICATIONS

First Office Action and First Search for Chinese Application No. 201610787281.9 dated Apr. 22, 2019 with English machine translation (9 pages).

(Continued)

*Primary Examiner* — Edwyn Labaze
(74) *Attorney, Agent, or Firm* — Sheppard Mullin Richter & Hampton LLP (57) ABSTRACT

This application discloses a digital object unique identifier (DOI) recognition method and device. The method comprises: obtaining a code scanning image; graying the code scanning image to obtain a grayscale value of each pixel in the code scanning image; determining a DOI image in the code scanning image according to the grayscale value of each pixel in the code scanning image; and recognizing the DOI image.

17 Claims, 9 Drawing Sheets

(56) References Cited

U.S. PATENT DOCUMENTS

| | | | |
|---|---|---|---|
| 10,192,087 B2 | 1/2019 | Davis et al. | |
| 2004/0099741 A1 | 5/2004 | Dorai et al. | |
| 2004/0175052 A1* | 9/2004 | Bian | G06K 7/14 382/254 |
| 2005/0103846 A1 | 5/2005 | Zhu et al. | |
| 2005/0240871 A1 | 10/2005 | Wilson | |
| 2007/0057066 A1* | 3/2007 | Cai | G06K 7/14 235/462.41 |
| 2011/0098029 A1 | 4/2011 | Rhoads et al. | |
| 2011/0142294 A1 | 6/2011 | Sagan et al. | |
| 2011/0259962 A1 | 10/2011 | Picard et al. | |
| 2013/0175340 A1 | 7/2013 | Endo et al. | |
| 2013/0193211 A1 | 8/2013 | Baqai et al. | |
| 2014/0032406 A1 | 1/2014 | Roach et al. | |
| 2014/0314320 A1 | 10/2014 | Bae et al. | |
| 2014/0363143 A1 | 12/2014 | Dharssi et al. | |
| 2015/0001303 A1* | 1/2015 | Adams, Jr. | G06K 9/4604 235/462.08 |
| 2015/0090792 A1* | 4/2015 | Zhang | G06K 7/1417 235/462.04 |
| 2015/0317923 A1* | 11/2015 | Edmonds | G02B 5/208 40/541 |
| 2016/0117532 A1 | 4/2016 | Lin et al. | |
| 2016/0314563 A1 | 10/2016 | Wang et al. | |
| 2017/0124441 A1* | 5/2017 | Picard | G06K 7/1417 |
| 2018/0276515 A1* | 9/2018 | Huang | G06F 3/0416 |
| 2019/0188438 A1 | 6/2019 | Liu | |
| 2019/0297219 A1* | 9/2019 | Santi | H04N 1/32267 |

FOREIGN PATENT DOCUMENTS

| | | | |
|---|---|---|---|
| CN | 102741858 A | 10/2012 | |
| CN | 102819724 A | 12/2012 | |
| CN | 102819850 A | 12/2012 | |
| CN | 103679638 A | 3/2014 | |
| CN | 104197899 A | 12/2014 | |
| CN | 103034831 B | 5/2015 | |
| CN | 106203431 A | 12/2016 | |
| CN | 106874818 A | 6/2017 | |
| FR | 2931979 A | 12/2009 | |
| JP | 2004178560 A | 6/2004 | |
| JP | 2005293579 A | 10/2005 | |
| JP | 2007521575 A | 8/2007 | |
| JP | 2012-033035 A | 2/2012 | |
| JP | 2014-535092 A | 12/2014 | |
| KR | 1020050051029 A | 6/2005 | |
| KR | 20080031456 A | 4/2008 | |
| KR | 10-1432429 B1 | 8/2014 | |
| KR | 10-2016-0054497 A | 5/2016 | |
| RU | 2520432 C2 | 6/2014 | |
| TW | 201600829 A | 1/2016 | |
| WO | 2005050390 A2 | 6/2005 | |
| WO | 2011005222 A1 | 1/2011 | |
| WO | 2015096535 A1 | 7/2015 | |
| WO | 2016115261 A1 | 7/2016 | |

OTHER PUBLICATIONS

Written Opinion of the International Searching Authority and International Search Report for PCT Application No. PCT/CN2017/097957 dated Nov. 15, 2017 (15 pages).

International Preliminary Report on Patentability Chapter I for PCT Application No. PCT/CN2017/097957 dated Mar. 14, 2019 (13 pages).

Office Action for Korean Application No. 10-2019-7008939 dated Oct. 29, 2019 (7 pages).

Non-final rejection and Search Report for Taiwanese Application No. 106119858 dated Nov. 25, 2019 (5 pages).

Notice of Allowance for Korean Application No. 10-2019-7008939 dated Feb. 17, 2020.

Office Action for Japanese Application No. 2019-511742 dated Mar. 10, 2020.

Search Report for European Application No. 17845250.4 dated Apr. 6, 2020.

* cited by examiner

DIGITAL OBJECT UNIQUE IDENTIFIER (DOI) RECOGNITION METHOD AND DEVICE

CROSS-REFERENCE TO RELATED APPLICATIONS

This application is a continuation application of International Patent Application No. PCT/CN2017/097957, filed on Aug. 18, 2017, which is based on and claims priority to Chinese Patent Application 201610787281.9, filed on Aug. 30, 2016, and entitled "DIGITAL OBJECT UNIQUE IDENTIFIER (DOI) RECOGNITION METHOD AND DEVICE." The above-referenced applications are incorporated herein by reference in their entirety.

TECHNICAL FIELD

This application relates to the field of computer technologies, and in particular, to a DOI recognition method and device.

BACKGROUND

A digital object unique identifier (DOI), as an identifier of a digitalized object, is equivalent to an identity card of a person, and is unique for an identified digital object. Such a feature ensures that the digitalized object is accurately extracted in a network environment, effectively avoiding repetition. A DOI of a digitalized object does not change once being generated, and does not change with attributes such as an owner of the copyright and a storage address of the digitalized object identified by the DOI.

Figure 1A:
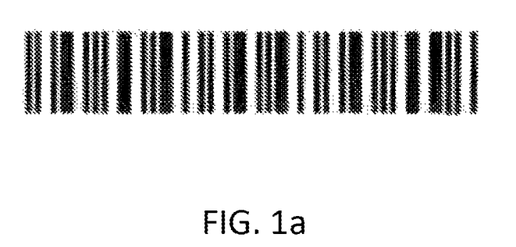
FIG. 1a shows a barcode image in the existing technology.
Figure 1B:
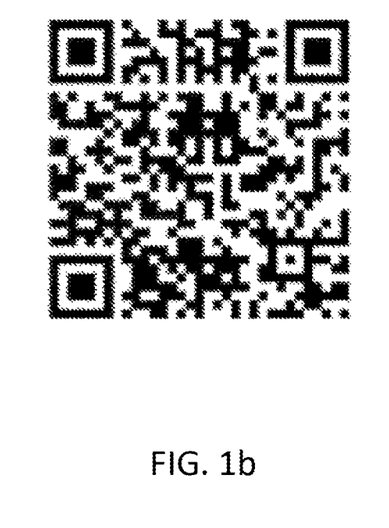
FIG. 1b shows a two-dimensional code image in the existing technology.
Figure 1C:
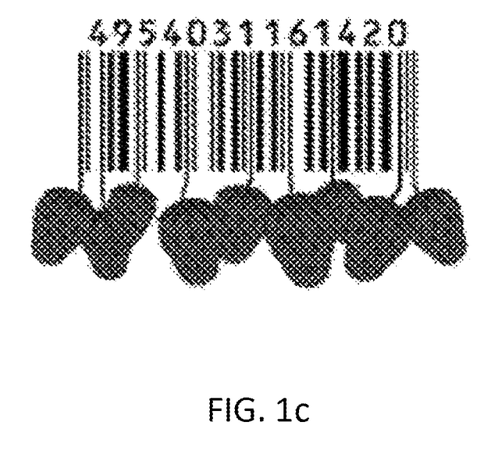
FIG. 1c shows an image including both a barcode image and a non-barcode image in the existing technology.
Figure 1D:
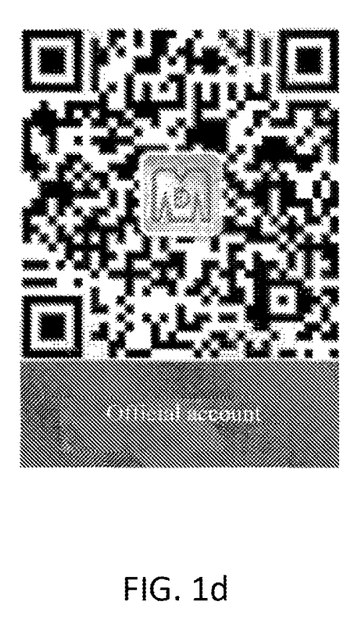
FIG. 1d shows an image including both a two-dimensional code image and a non-two-dimensional code image in the existing technology.

In actual applications, barcodes or two-dimensional codes widely used by people are DOIs. For example, as shown in FIG. 1a and FIG. 1b, the image shown in FIG. 1a is a barcode, and the image shown in FIG. 1b is a two-dimensional code. Sometimes, an image in which a barcode or a two-dimensional code is located does not only include the barcode or the two-dimensional code, but also includes other patterns, for example, as shown in FIG. 1c and FIG. 1d.

When a user performs code scanning by using code scanning software, the code scanning software saves an image within a code scanning frame (which is referred to as a code scanning image hereafter) locally, then binarizes the code scanning image, performs corresponding processing after binarization, and finally recognizes the barcode or the two-dimensional code. When a user scans the barcode or the two-dimensional code shown in FIG. 1c or FIG. 1d by using the code scanning software, due to a relatively long distance or other reasons, an image within the code scanning frame may include not only the barcode or the two-dimensional code, but also a pattern other than the barcode or the two-dimensional code. Therefore, when binarizing the code scanning image, the code scanning software needs to binarize the region of the barcode or the two-dimensional code, as well as the region of a non-barcode or a non-two-dimensional code. This consumes a relatively longer processing time and a relatively larger quantity of processing resources, compared with merely processing the region of the barcode or the two-dimensional code.

SUMMARY

Embodiments of this application provide a DOI recognition method and device, to resolve a problem in the existing technology that when a code scanning image includes both a DOI image and a non-DOI image, time consumed in recognizing the DOI image in the code scanning image is relatively long.

The following technical solutions are used in the embodiments of this application:

According to one aspect, a digital object unique identifier (DOI) recognition method comprises:
obtaining a code scanning image;
graying the code scanning image to obtain a grayscale value of each pixel in the code scanning image;
determining a DOI image in the code scanning image according to the grayscale value of each pixel in the code scanning image; and
recognizing the DOI image.

In some embodiments, determining a DOI image in the code scanning image comprises: determining an average grayscale value of all of the pixels in the code scanning image; for grayscale values that are not smaller than the average grayscale value or for grayscale values that are not greater than the average grayscale value, determining a correspondence between each of the grayscale values and a quantity of pixels having the grayscale value; determining, according to the correspondence, a grayscale value corresponding to a maximum quantity of pixels in the correspondence, to be a maximum grayscale value; for the maximum grayscale value, determining a sub image boundary according to pixels whose grayscale values are the maximum grayscale value, and determining one or more sub images within the sub image boundary in the code scanning image; and determining the DOI image in the sub images.

In other embodiments, determining the DOI image in the sub images comprises: selecting a sub image of a preset shape from the sub images to be the determined DOI image.

In still other embodiments, determining a sub image boundary comprises: determining a rectangular sub image boundary; and selecting a sub image of a preset shape from the sub images comprises: selecting, according to length-width ratios of the sub images, a sub image whose length-width ratio falls within a preset range.

In yet other embodiments, determining the DOI image in the sub images comprises: for each of the sub images, determining a ratio of quantities of pixels having different grayscale values in the sub image; and in the sub images, selecting a sub image for which the determined ratio is of a preset value to be the determined DOI image.

In other embodiments, determining a ratio of quantities of pixels having different grayscale values in the sub image comprises: determining a ratio of the quantity of pixels whose grayscale values are smaller than the average grayscale value to the quantity of pixels whose grayscale values are greater than the average grayscale value in the sub image.

In still other embodiments, the DOI image comprises at least one of a barcode and a two-dimensional code.

According to another aspect, a digital object unique identifier (DOI) recognition device comprises: one or more processors and one or more non-transitory computer-readable memories coupled to the one or more processors and configured with instructions executable by the one or more processors to cause the device to perform operations comprising: obtaining a code scanning image; graying the code scanning image to obtain a grayscale value of each pixel in the code scanning image; determining a DOI image in the code scanning image according to the grayscale value of each pixel in the code scanning image; and recognizing the DOI image.

According to yet another aspect, a non-transitory computer-readable storage medium storing instructions executable by one or more processors to cause the one or more processors to perform operations comprising: obtaining a code scanning image; graying the code scanning image to obtain a grayscale value of each pixel in the code scanning image; determining a DOI image in the code scanning image according to the grayscale value of each pixel in the code scanning image; and recognizing the DOI image.

At least one of the foregoing technical solutions used in the embodiments of this application can achieve the following beneficial effects:

When a code scanning image not only includes a DOI image, but also includes a non-DOI image, by using the DOI recognition method provided in the embodiments of this application, the code scanning image can be grayed, to obtain grayscale values of pixels in the code scanning image, a DOI image in the code scanning image is determined according to the grayscale values, and further, the DOI image is recognized. Therefore, the DOI recognition method provided in the embodiments of this application can resolve the problem in the existing technology that when a code scanning image includes both a DOI image and a non-DOI image, time consumed in recognizing the DOI image in the code scanning image is relatively long.

BRIEF DESCRIPTION OF THE DRAWINGS

The accompanying drawings described herein are used to provide a further understanding of this application, and form part of this application. Embodiments of this application and descriptions thereof are used to explain this application, and do not constitute any inappropriate limitation to this application. In the accompanying drawings.

DETAILED DESCRIPTION OF THE APPLICATION

To make objectives, technical solutions, and advantages of this application clearer, the following clearly and completely describes the technical solutions of this application with reference to embodiments and corresponding accompanying drawings of this application. Apparently, the described embodiments are merely some but not all of the embodiments of this application. All other embodiments obtained by a person of ordinary skill in the art based on the embodiments of this application without creative efforts shall fall within the protection scope of this application.

The following describes in detail the technical solutions provided in the embodiments of this application with reference to the accompanying drawings.

To resolve a problem in the existing technology that when a code scanning image includes both a DOI image and a non-DOI image, time consumed in recognizing the DOI image in the code scanning image is relatively long, an embodiment of this application provides a DOI recognition method.

An execution body of the method may include, but is not limited to, a user terminal such as a mobile phone, a tablet computer, or a personal computer (PC), an application (APP) running on the user terminals, or a device such as a server.

For convenience of description, the following describes implementations of the method by using an example in which the execution body of the method is an APP. It may be understood that the execution body of the method being an APP is merely an example of description, and should not be understood as a limitation to the method.

Figure 2A:
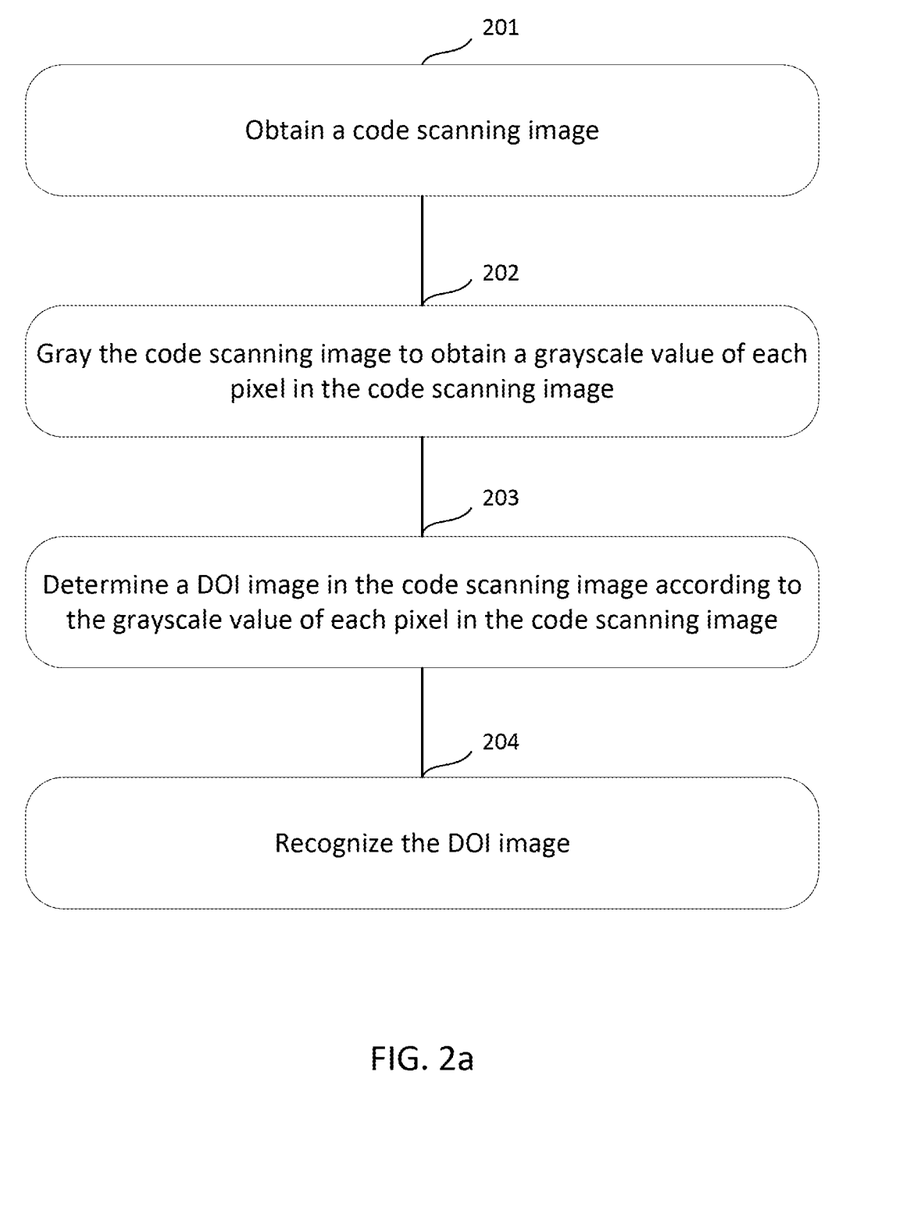
FIG. 2a is a flowchart of a DOI recognition method according to an embodiment of this application.

A schematic flowchart of the method is shown in FIG. 2a, including the following steps:

Step 201. Obtain a code scanning image.

In actual applications, when a user scans a DOI image by using a code scanning APP, the APP locally saves an image within a code scanning frame, namely, the code scanning image, for convenience of performing a subsequent corresponding operation to recognize the DOI image in the code scanning image. The DOI image includes, but is not limited to, a barcode, a two-dimensional code, or the like.

Step 202. Gray the code scanning image, to obtain a grayscale value of each pixel in the code scanning image.

Before graying the code scanning image, the APP may first obtain color channel information of each pixel in the code scanning image, and then gray the code scanning image according to the color channel information.

In actual applications, a color standard of an image is usually in an RGB color mode. R, G, and B respectively represent colors of three channels: a red channel, a green channel, and a blue channel. The RGB color mode allocates a strength value ranging from 0 to 255 to R, G, and B components of each pixel. For example, the pure red R value is 255, the G value is 0, and the B value is 0. Only three colors are used for an RGB image, to enable the three colors to be mixed according to different ratios, and show different colors on a screen.

The obtaining color channel information of each pixel in the code scanning image is to obtain an R value, a G value, and a B value of each pixel in the code scanning image.

The graying process is that in an RGB color model, an R value, a G value, and a B value of each pixel are converted into an R value, a G value, and a B value that are equal. The R value, the G value, and the B value obtained after graying are a grayscale value of the pixel.

In some embodiments, an APP can perform weighted averaging on an R value, a G value, and a B value of each pixel in the code scanning image according to a formula: grayscale value=$R*a+G*b+B*c$, to obtain a value, and use the value as the grayscale value. Then, each pixel in the code scanning image is grayed according to the grayscale value obtained after weighted averaging, to obtain a relatively reasonable grayscale image. In the formula: grayscale value=$R*a+G*b+B*c$, a, b, and c are not negative numbers, and $a+b+c=1$. Values of a, b, and c may be set according to different requirements. For example, grayscale value=R*0.299+G*0.587+B*0.114.

Step 203. Determine a DOI image in the code scanning image according to the grayscale value of each pixel in the code scanning image.

In this application, the DOI image can be determined in the code scanning image by using a feature of the DOI image.

For example, if the DOI image is a two-dimensional code, the APP can determine the two-dimensional code in the code scanning image according to a feature of the two-dimensional code. The two-dimensional code is a black and white checkered pattern distributed in a plane according to a particular geometrical arrangement. Generally, the two-dimensional code occupies most area of the entire code scanning image, and the two-dimensional code is generally located in a central region of the code scanning image. In addition, the two-dimensional code is of a particular shape, and may be of a square shape, a circular shape, or the like. This is not limited in this embodiment of this application. A grayscale value of a pixel having a relatively dark color and forming the two-dimensional code is generally the smallest or a smaller grayscale value in the code scanning image, and a grayscale value of a pixel having a relatively light color and forming the two-dimensional code is generally the largest or a larger grayscale value in the code scanning image. If a non-two-dimensional code region in the code scanning image has a relatively light color, the two-dimensional code can further be determined by searching the code scanning image for an image formed by pixels having a relatively dark color. If a non-two-dimensional code region in the code scanning image has a relatively dark color, the two-dimensional code can further be determined by searching the code scanning image for an image formed by pixels having a relatively light color.

If the DOI image is a barcode, the APP can determine the barcode in the code scanning image according to a feature of the barcode. The barcode is a pattern identifier formed by arranging, according to an encoding rule, a plurality of black strips and white strips having different widths, and used to express a group of information. A common barcode is a pattern formed by parallel black strips and white strips whose reflectivity differs a lot. Generally, the barcode occupies most area of the entire code scanning image, and the barcode is generally located in a central region of the code scanning image. In addition, the barcode is generally rectangular. A length of the barcode in a horizontal direction is longer than a length in a vertical direction. A grayscale value of a pixel having a relatively dark color and forming the barcode is generally the smallest or a smaller grayscale value in the code scanning image, and a grayscale value of a pixel having relatively light color and forming the barcode is generally the largest or a larger grayscale value in the code scanning image. If a non-barcode region in the code scanning image has a relatively light color, the barcode can further be determined by searching the code scanning image for a rectangular image formed by pixels having a relatively dark color. If a non-barcode region in the code scanning image has a relatively dark color, the barcode can further be determined by searching the code scanning image for a rectangular image formed by pixels having a relatively light color.

Therefore, the APP can determine the DOI image in the code scanning image according to a feature on grayscale of the DOI image.

Step 204. Recognize the DOI image.

The APP can binarize the determined DOI image, then perform related processing, and finally recognize the DOI image. Binarization is to set grayscale values of pixels on an image to A or B, where A and B may be 0 or a positive integer. For example, if A=0, and B=255, binarization is to cause an entire image to be present as merely obvious black and white visual effect.

In the DOI recognition method provided in this application, the APP binarizes the DOI image, performs corresponding processing on the binarized DOI image, and finally recognizes the DOI image. In a DOI recognition method in the existing technology, not only a DOI image is binarized, but also an entire code scanning image is binarized, corresponding processing is performed on the entire binarized code scanning image, and finally the DOI image is recognized. Therefore, the DOI recognition method provided in this application consumes a shorter period of time in both binarization and other subsequent corresponding operations than the existing technology does. In addition, time consumed in binarization is not in a simple linear proportional relationship with a size of an image. For example, a sum of time consumed in merely binarizing the two-dimensional code in FIG. 1d and time consumed in merely binarizing the non-two-dimensional code in FIG. 1d is greatly shorter than time consumed in binarizing the entire image shown in FIG. 1d. The operation of determining the DOI image in the code scanning image in this embodiment of this application is a simple image preprocessing process, and consumes a very short period of time. Therefore, compared with the existing technology, the DOI recognition method provided in this embodiment of this application consumes a shorter period of time in recognizing a DOI.

Figure 2B:
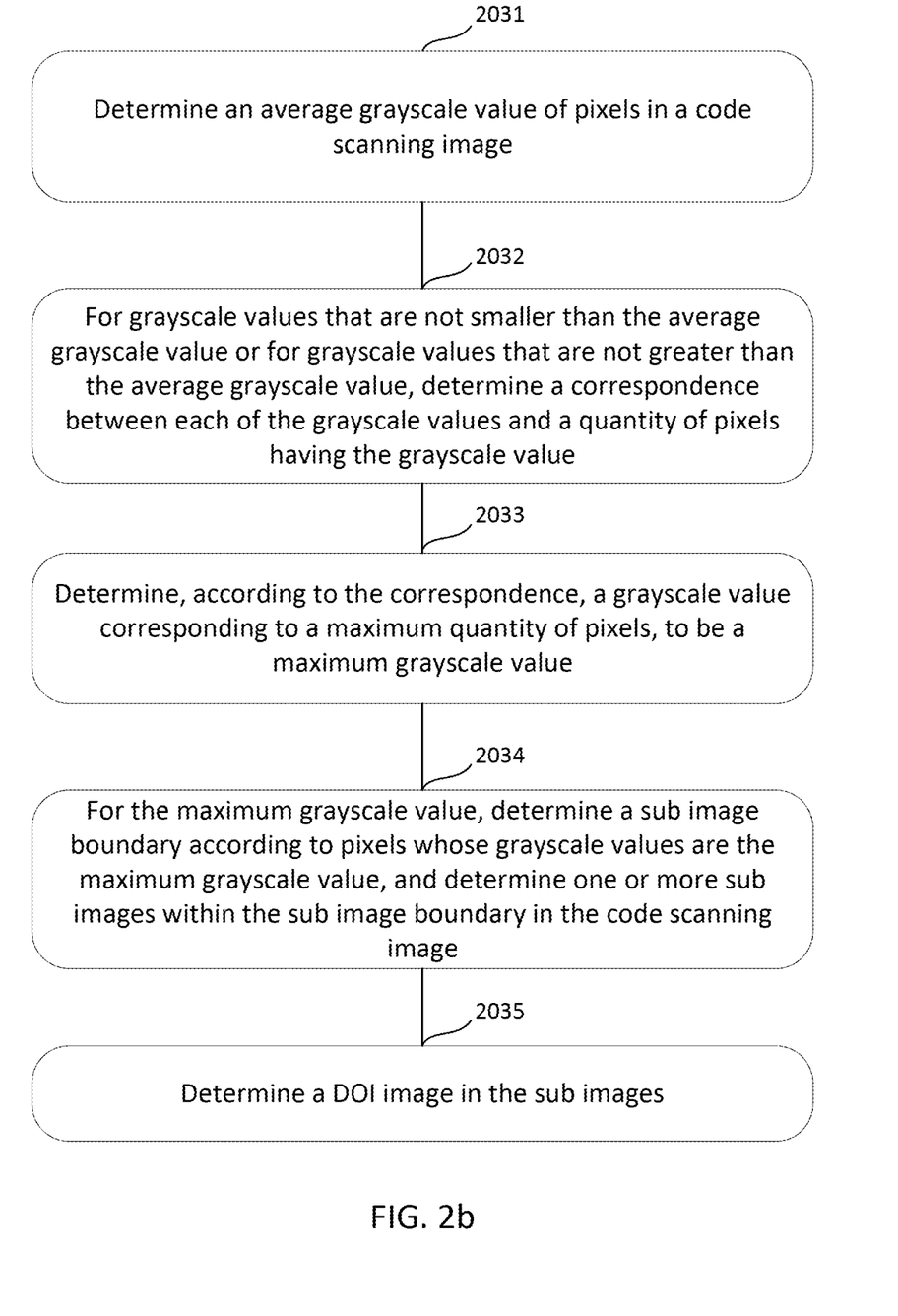
FIG. 2b is a flowchart of a method for determining a DOI image according to an embodiment of this application.

After the overall procedure of recognizing a DOI has been described in the embodiments of this application, the following describes how to determine the DOI image in the code scanning image in the step 203. The procedure of determining the DOI image is shown in FIG. 2b, including the following steps:

Sub step 2031. Determine an average grayscale value of all of the pixels in the code scanning image.

The APP can obtain a quantity of pixels in the code scanning image, and determine the average grayscale value of the pixels in the code scanning image according to the grayscale values of the pixels in the code scanning image, so that the APP can determine the DOI image according to a feature on grayscale of the DOI image.

Sub step 2032. for the grayscale values that are not smaller than the average grayscale value or for the grayscale values that are not greater than the average grayscale value, determine a correspondence between each of the grayscale values and a quantity of pixels having the grayscale value.

Figure 2C:
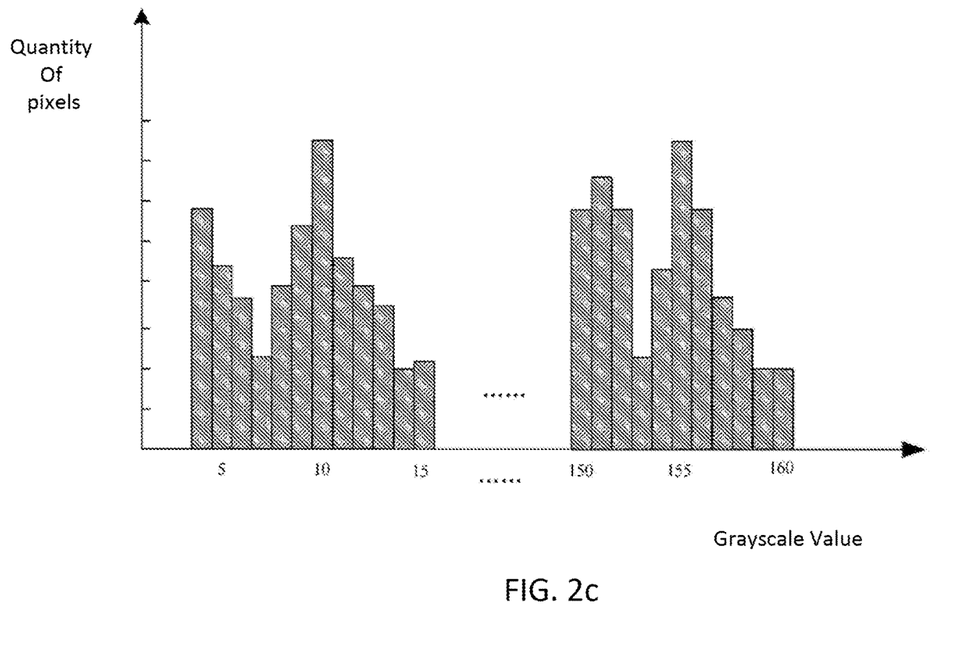
FIG. 2c is a grayscale histogram of a code scanning image according to an embodiment of this application.

The correspondence between the grayscale value and the quantity of pixels that is described in this application may be a function relationship between the quantity of pixels and the grayscale value. The function relationship may be represented as a continuous function, or may be represented as a discrete function. In some embodiments, after graying the code scanning image, the APP may obtain a grayscale histogram of the code scanning image. The grayscale histogram is a function related to distribution of grayscale values, that is, a discrete function between the grayscale value and the quantity of pixels. For example, as shown in FIG. 2c, the image shown in FIG. 2c is a grayscale histogram. A horizontal coordinate of the grayscale histogram represents a grayscale value, and a vertical coordinate represents the quantity of pixels.

The correspondence between the grayscale value that is not smaller than the average grayscale value and the quantity of pixels having the grayscale value or the correspondence between the grayscale value that is not greater than the average grayscale value and the quantity of pixels having the grayscale value may be a function relationship between the grayscale value and the quantity of pixels having the grayscale value. Therefore, the correspondence between the grayscale value and the quantity of pixels having the grayscale value can be determined according to the grayscale histogram of the code scanning image and the average grayscale value.

Generally, the DOI image is the part having the deepest or relatively deeper color in the code scanning image. Generally, a smaller grayscale value indicates a darker color of a pixel corresponding to the grayscale value. Therefore, in the code scanning image, an approximate position of the DOI image in the code scanning image can be determined by determining a correspondence between the grayscale value that is not greater than the average grayscale value and the quantity of pixels having the grayscale value, to facilitate the APP to subsequently determine the DOI image.

If a smaller grayscale value indicates a lighter color of a pixel corresponding to the grayscale value, an approximate position of the DOI image in the code scanning image can be determined by determining a correspondence between the grayscale value that is not smaller than the average grayscale value in the code scanning image and the quantity of pixels having the grayscale value, to facilitate the APP to subsequently determine the DOI image.

Sub step 2033. Determine, according to the correspondence, a grayscale value corresponding to a maximum quantity of pixels in the correspondence, to be a maximum grayscale value.

If the correspondence determined through the sub step 2032 is the correspondence between the quantity of pixels and the grayscale value that is not greater than the average grayscale value, the maximum quantity of pixels can be determined according to the function relationship between the quantity of pixels and the grayscale value that is not greater than the average grayscale value. A grayscale value corresponding to the maximum quantity of pixels is the maximum grayscale value. There may be one maximum grayscale value or at least two maximum grayscale values. This is related to an DOI image in actual applications.

Generally, the DOI image is the part having the deepest or relatively deeper color in the code scanning image, and the DOI image occupies most part of the region of the code scanning image. Therefore, the DOI image can be further determined by determining the maximum grayscale value.

Sub step 2034. For the maximum grayscale value, determine a sub image boundary according to pixels whose grayscale values are the maximum grayscale value, and determine one or more sub images within the sub image boundary in the code scanning image.

In the code scanning image, a sub image formed by the pixels corresponding to the maximum grayscale value can be determined. The sub image may be the DOI image. Before the sub image is determined, the sub image boundary may be first determined. Because different DOI images have different shapes, methods for determining a sub image boundary are different. The following respectively describes the method for determining a sub image boundary in different cases.

In a first case, when the DOI image is a two-dimensional code, the APP may determine the sub image boundary according to the following method:

If the two-dimensional code is square, the APP may frame the pixels corresponding to the maximum grayscale value in a rectangular box. The pixels corresponding to the maximum grayscale value at the outermost edges in four directions, namely, the upper direction, the lower direction, the left direction, and the right direction in the code scanning image are exactly distributed on four sides of the rectangular box. A boundary corresponding to the rectangular box may serve as the sub image boundary. Alternatively, the APP may determine the pixels corresponding to the maximum grayscale value at the outermost edges in four directions, namely, the upper direction, the lower direction, the left direction, and the right direction in the code scanning image, and then determine the sub image boundary according to the pixels. For example, the APP determines pixels corresponding to the maximum grayscale value on the leftmost side in the code scanning image, and determines a vertical line going through the pixels. The vertical line is the boundary on the leftmost side of the sub image. The APP determines pixels corresponding to the maximum grayscale value on the lowermost side in the code scanning image, and determines a horizontal line going through the pixels. The horizontal line is the boundary on the lowermost side of the sub image. Similarly, the APP may determine boundaries of the rightmost side and the uppermost side of the sub image. In this way, the boundary of the sub image is determined.

If the two-dimensional code is round or of another shape, the APP may determine a minimum region that can cover all pixels corresponding to the maximum grayscale value and that is of the same shape of that of the two-dimensional code, and then use a boundary of the minimum region as the sub image boundary.

In a second embodiment, when the DOI image is a barcode, the APP may determine the sub image boundary according to the following method:

If the barcode is rectangular, the APP may frame the pixels corresponding to the maximum grayscale value in a rectangular box. The pixels corresponding to the maximum grayscale value at the outermost edges in four directions, namely, the upper direction, the lower direction, the left direction, and the right direction in the code scanning image are exactly distributed on four sides of the rectangular box. A boundary corresponding to the rectangular box may serve as the sub image boundary.

In this embodiment of this application, a shape of a DOI image that is to be operated may be preset, to facilitate the APP to determine the sub image boundary by using a proper method.

After the sub image boundary is determined, the sub images in the code scanning image within the sub image boundary may be determined. There may be one or at least two sub images.

Sub step 2035. Determine the DOI image in the sub images.

Figure 2D:
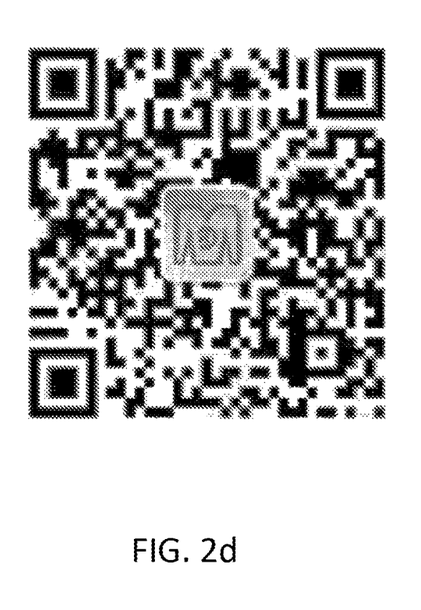
FIG. 2d shows a determined DOI image according to an embodiment of this application.

After the sub images are determined, the APP may determine the DOI image in the sub images according to a feature of a DOI. The APP may select a sub image of a preset shape according to shapes of the sub images, to be the determined DOI image. For example, when the DOI image is a two-dimensional code, if the determined sub image boundary is rectangular, the APP may select, according to length-width ratios of the sub images, a sub image whose length-width ratio falls within a preset length-width ratio range, to be the two-dimensional code. The preset ratio may be a value, or may be a range. This is not limited in this embodiment of this application. Sometimes, there may be more than one sub image whose length-width ratio falls within the preset length-width ratio range, for example, at least two, etc. In some embodiments, a sub image whose length-width ratio is the closest to 1 is determined as the two-dimensional code. The reason is that generally, the two-dimensional code is square or round. Therefore, a length-width ratio of the two-dimensional code should be 1. For example, if the APP is to determine the two-dimensional code image shown in FIG. 1d, the two-dimensional code image determined through the sub step 2031 to the sub step 2035 may be shown in FIG. 2d.

When the DOI image is a barcode, if the determined sub image boundary is rectangular, and if the length-width ratio of the sub image satisfies a preset length-width ratio, for example, the preset length-width ratio is 1 to 100, it is determined that the sub image is a barcode. If there are at least two sub images satisfying this condition, one of the sub images is randomly selected to serve as the barcode.

In addition to determining the DOI image according to the shapes of the sub images, the APP may further determine the DOI image according to quantity ratios of pixels. For example, for each of the sub images, the APP determines ratios of quantities of pixels having different grayscale values in the sub image; and in the sub images, selects a sub image for which a ratio of the quantities of pixels is of a preset value to be the determined DOI image. The determining quantity ratios of pixels having different grayscale values in the sub image may be determining a ratio of the quantity of pixels whose grayscale values are smaller than the average grayscale value in the sub image to the quantity of pixels whose grayscale values are greater than the average grayscale value, or, the quantity ratios of pixels may be ratios of quantities of pixels of all grayscale values. For example, when the DOI image is a two-dimensional code or a barcode, a ratio of the quantity of pixels whose grayscale values are smaller than the average grayscale value to the quantity of pixels whose grayscale values are greater than the average grayscale value in the two-dimensional code and that in the barcode is basically 1:1. A sub image in which a ratio of the quantity of pixels whose grayscale values are smaller than the average grayscale value to the quantity of pixels whose grayscale values are greater than the average grayscale value is the closest to 1:1 is determined as the two-dimensional code or the barcode.

In some embodiments, the APP may determine the DOI image by simultaneously using the foregoing two methods, or may determine the DOI image by using one of the methods. This is not limited in this application.

In this embodiment of this application, the APP may further determine the sub image boundary by using the following method, and further determine the DOI image. After determining the average grayscale value of the code scanning image, the APP may determine all grayscale values within a range of the average grayscale value±d, respectively determine, for the grayscale values, pixels corresponding to the grayscale values, determine a sub image boundary corresponding to the pixels, and then, determine the DOI image according to the foregoing method for determining a DOI, where "d" is a preset value, and may be any positive integer, and a value corresponding to the average grayscale value±d is within 0 to 255.

In the embodiments of this application, the DOI recognition method provided in the embodiments of this application may be implemented by using a DOI recognition device.

Figure 3:
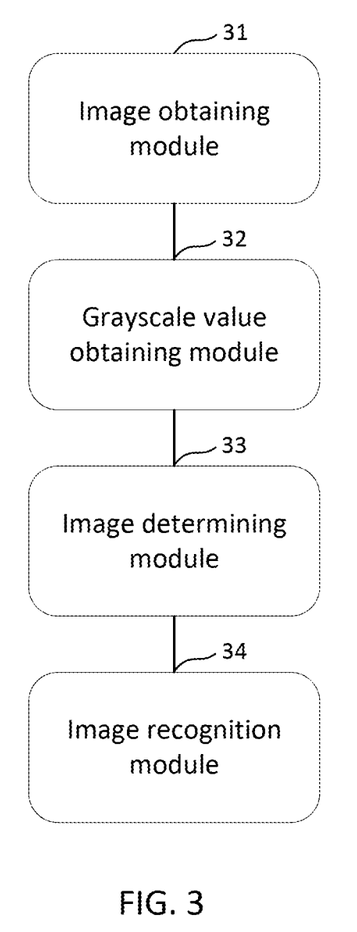
FIG. 3 is a schematic structural diagram of a DOI recognition device according to an embodiment of this application.

FIG. 3 is a schematic structural diagram of a DOI recognition device according to an embodiment of this application, mainly including the following modules:

an image obtaining module 31, configured to obtain a code scanning image;

a grayscale value obtaining module 32, configured to gray the code scanning image, to obtain a grayscale value of each pixel in the code scanning image;

an image determining module 33, configured to determine a DOI image in the code scanning image according to the grayscale value of each pixel in the code scanning image; and an image recognition module 34, configured to recognize the DOI image.

In an implementation, the image determining module 33 is configured to: determine an average grayscale value of all of the pixels in the code scanning image;

for the grayscale values that are not smaller than the average grayscale value or for the grayscale values that are not greater than the average grayscale value, determining a correspondence between each of the grayscale values and a quantity of pixels having the grayscale value;

determine, according to the correspondence, a grayscale value corresponding to a maximum quantity of pixels in the correspondence, to be a maximum grayscale value;

for the maximum grayscale value, determine a sub image boundary according to pixels, whose grayscale values are the maximum grayscale value, and determine one or more sub images within the sub image boundary in the code scanning image; and determine the DOI image in the sub images.

In an implementation, the image determining module 33 is configured to: select a sub image of a preset shape according to shapes of the sub images, to be the determined DOI image; and/or for each of the sub images, determining a ratio of quantities of pixels having different grayscale values in the sub image; and in the sub images, selecting a sub image for which the determined ratio is of a preset value to be the determined DOI image.

In an implementation, the image determining module 33 is configured to: determine a rectangular sub image boundary; and select, according to length-width ratios of the sub images, a sub image whose length-width ratio falls within a preset length-width ratio range.

In an implementation, the image determining module 33 is configured to determining a ratio of the quantity of pixels whose grayscale values are smaller than the average grayscale value to the quantity of pixels whose grayscale values are greater than the average grayscale value in the sub image.

In an implementation, the DOI image includes at least one of a barcode and a two-dimensional code.

When a code scanning image not only includes a DOI image, but also includes a non-DOI image, by using the DOI recognition method provided in the embodiments of this application, the code scanning image can be grayed, to obtain grayscale values of pixels in the code scanning image, a DOI image in the code scanning image is determined according to the grayscale values, and further, the DOI image is recognized. Therefore, the DOI recognition method provided in this embodiment of this application can resolve the problem in the existing technology that when a code scanning image includes both a DOI image and a non-DOI image, time consumed in recognizing the DOI image in the code scanning image is relatively long.

A person skilled in the art should understand that the embodiments of the specification may be provided as a method, a system, or a computer program product. Therefore, the invention may use a form of hardware only embodiments, software only embodiments, or embodiments with a combination of software and hardware. Moreover, the invention may use a form of a computer program product that is implemented on one or more computer-usable storage media (including but not limited to a disk memory, a compact disc read-only memory (CD-ROM), an optical memory, and the like) that include computer-usable program code.

The embodiments are described with reference to flowcharts and/or block diagrams of the method, device (system), and the computer program product in the specification. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a function in one or more processes in the flowcharts and/or in one or more blocks in the block diagrams.

These computer program instructions may also be stored in a computer readable memory that can instruct the computer or any other programmable data processing device to work in a manner, so that the instructions stored in the computer readable memory generate an artifact that includes an instruction apparatus. The instruction apparatus implements a function in one or more processes in the flowcharts and/or in one or more blocks in the block diagrams.

These computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a function in one or more processes in the flowcharts and/or in one or more blocks in the block diagrams.

In a typical configuration, a computing device includes one or more processors (CPU), an input/output interface, a network interface, and a memory.

The memory may include forms such as a volatile memory in computer-readable mediums, a random access memory (RAM) and/or a non-volatile memory, for example, a read-only memory (ROM) or a flash RAM. The memory is an example of the computer-readable medium.

The computer-readable medium includes permanent and nonpermanent mediums and movable and non-movable mediums. Information may be stored by using any method or technology. The information may be a computer-readable instruction, a data structure, a module of a program, or other data. Examples of a storage medium of a computer includes, but is not limited to, a phase change memory (PRAM), a static random access memory (SRAM), a dynamic random access memory (DRAM), or other types of random access memory (RAM), a read-only memory (ROM), an erasable programmable read only memory (EEPROM), a flash memory or another storage technology, a compact disc read-only memory (CD-ROM), a digital versatile disc (DVD) or another optical storage, or a cartridge tape. A magnetic storage of a magnetic tape or a disc, another magnetic storage device, or any other non-transmission medium may be configured to store information that can be accessed by a computing device. According to the definitions in this specification, the computer-readable medium does not include transitory media, such as a modulated data signal or carrier.

It should be further noted that the terms "comprise," "include," and any variants thereof are intended to cover a non-exclusive inclusion. Therefore, a process, method, product, or device that includes a series of elements not only includes such elements, but also includes other elements not specified expressly, or may include inherent elements of the process, method, product, or device. Unless otherwise specified, an element limited by "include a/an . . . " does not exclude other same elements existing in the process, the product, the article, or the device that includes the element.

A person skilled in the art should understand that the embodiments of the present application may be provided as a method, a system, or a computer program product. Therefore, this application may take the form of total hardware embodiments, total software embodiments, or embodiments combining software and hardware. In addition, this application may take the form of a computer program product implemented on one or more computer-usable storage media (including, but not limited to, a magnetic storage device, a CD-ROM, and an optical storage device) including computer-usable program code.

The foregoing is merely the embodiments of this application, and is not intended to limit this application. For a person skilled in the art, this application may have various modifications and variations. Any modifications, equivalent substitutions, and improvements made within the spirit and principle of this application shall fall within the protection scope of claims of this application.

What is claimed is:

1. A digital object unique identifier (DOI) recognition method, comprising:
   obtaining a code scanning image;
   graying the code scanning image to obtain a grayscale value of each pixel in the code scanning image;
   determining an average grayscale value of all of the pixels in the code scanning image;
   for grayscale values that are not smaller than the average grayscale value or for grayscale values that are not greater than the average grayscale value, determining a correspondence between each of the grayscale values and a quantity of pixels having a respective one of the grayscale values;
   determining one or more grayscale values corresponding to a maximum quantity of pixels in the correspondence, to be one or more maximum grayscale values;
   determining, in the code scanning image, one or more sub image boundaries each according to pixels having grayscale values that are a respective one of the one or more maximum grayscale values;
   determining one or more sub images each within a respective one of the one or more sub image boundaries;
   determining a DOI image in the one or more sub images; and
   recognizing the DOI image.

2. The method according to claim 1, wherein the determining the DOI image in the one or more sub images comprises:
   selecting a sub image of a preset shape from the one or more sub images to be the determined DOI image.

3. The method according to claim 2, wherein the determining a sub image boundary in the code scanning image comprises:

determining a rectangular sub image boundary; and
wherein the selecting a sub image of a preset shape from the one or more sub images comprises:
selecting, according to length-width ratios of the sub images, a sub image having a length-width ratio that falls within a preset range.

4. The method according to claim 1, wherein the determining the DOI image in the one or more sub images comprises:
determining a ratio of quantities of pixels having different grayscale values in each of the one or more sub images; and
in the one or more sub images, selecting a sub image for which the determined ratio is of a preset value to be the determined DOI image.

5. The method according to claim 4, wherein the determining a ratio of quantities of pixels having different grayscale values in each of the one or more sub images comprises:
determining a ratio of the quantity of pixels having grayscale values that are smaller than the average grayscale value to the quantity of pixels having grayscale values that are greater than the average grayscale value in the each of the one or more sub images.

6. The method according to claim 1, wherein the DOI image comprises a barcode or a two-dimensional code.

7. A digital object unique identifier (DOI) recognition device, comprising one or more processors and one or more non-transitory computer-readable memories coupled to the one or more processors and configured with instructions executable by the one or more processors to cause the device to perform operations comprising:
obtaining a code scanning image;
graying the code scanning image to obtain a grayscale value of each pixel in the code scanning image;
determining an average grayscale value of all of the pixels in the code scanning image;
for grayscale values that are not smaller than the average grayscale value or for grayscale values that are not greater than the average grayscale value, determining a correspondence between each of the grayscale values and a quantity of pixels having a respective one of the grayscale values;
determining one or more grayscale values corresponding to a maximum quantity of pixels in the correspondence, to be one or more maximum grayscale values;
determining, in the code scanning image, one or more sub image boundaries each according to pixels having grayscale values that are a respective one of the one or more maximum grayscale values;
determining one or more sub images each within a respective one of the one or more sub image boundaries;
determining a DOI image in the one or more sub images; and
recognizing the DOI image.

8. The device according to claim 7, wherein the determining the DOI image in the one or more sub images comprises:
selecting a sub image of a preset shape from the one or more sub images to be the determined DOI image.

9. The device according to claim 8, wherein the determining a sub image boundary in the code scanning image comprises:
determining a rectangular sub image boundary; and
wherein the selecting a sub image of a preset shape from the one or more sub images comprises:
selecting, according to length-width ratios of the sub images, a sub image having a length-width ratio that falls within a preset range.

10. The device according to claim 7, wherein the determining the DOI image in the one or more sub images comprises:
determining a ratio of quantities of pixels having different grayscale values in each of the one or more sub images; and
in the one or more sub images, selecting a sub image for which the determined ratio is of a preset value to be the determined DOI image.

11. The device according to claim 10, wherein the determining a ratio of quantities of pixels having different grayscale values in each of the one or more sub images comprises:
determining a ratio of the quantity of pixels whose grayscale values are smaller than the average grayscale value to the quantity of pixels having grayscale values that are greater than the average grayscale value in the each of the one or more sub images.

12. The device according to claim 7, wherein the DOI image comprises a barcode or a two-dimensional code.

13. A non-transitory computer-readable storage medium storing instructions executable by one or more processors to cause the one or more processors to perform operations comprising:
obtaining a code scanning image;
graying the code scanning image to obtain a grayscale value of each pixel in the code scanning image;
determining an average grayscale value of all of the pixels in the code scanning image;
for grayscale values that are not smaller than the average grayscale value or for grayscale values that are not greater than the average grayscale value, determining a correspondence between each of the grayscale values and a quantity of pixels having a respective one of the grayscale values;
determining one or more grayscale values corresponding to a maximum quantity of pixels in the correspondence, to be one or more maximum grayscale values;
determining, in the code scanning image, one or more sub image boundaries each according to pixels having grayscale values that are a respective one of the one or more maximum grayscale values;
determining one or more sub images each within a respective one of the one or more sub image boundaries;
determining a DOI image in the one or more sub images; and
recognizing the DOI image.

14. The non-transitory computer-readable storage medium according to claim 13, wherein the determining the DOI image in the one or more sub images comprises:
selecting a sub image of a preset shape from the one or more sub images to be the determined DOI image.

15. The non-transitory computer-readable storage medium according to claim 14, wherein the determining a sub image boundary in the code scanning image comprises:
determining a rectangular sub image boundary; and
wherein the selecting a sub image of a preset shape from the one or more sub images comprises:
selecting, according to length-width ratios of the sub images, a sub image having a length-width ratio that falls within a preset range.

16. The non-transitory computer-readable storage medium according to claim 13, wherein the determining the DOI image in the one or more sub images comprises:
  determining a ratio of quantities of pixels having different grayscale values in each of the one or more sub images; and
  in the one or more sub images, selecting a sub image for which the determined ratio is of a preset value to be the determined DOI image.

17. The non-transitory computer-readable storage medium according to claim 16, wherein the determining a ratio of quantities of pixels having different grayscale values in each of the one or more sub images comprises:
  determining a ratio of the quantity of pixels whose grayscale values are smaller than the average grayscale value to the quantity of pixels whose grayscale values are greater than the average grayscale value in the each of the one or more sub images.

* * * * *